United States Patent
Imura et al.

(10) Patent No.: US 9,932,072 B2
(45) Date of Patent: Apr. 3, 2018

(54) VEHICLE STRUCTURE

(71) Applicant: HONDA MOTOR CO., LTD., Tokyo (JP)

(72) Inventors: Ryota Imura, Wako (JP); Masanori Hayashi, Wako (JP); Tamaki Mikami, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/298,996

(22) Filed: Oct. 20, 2016

(65) Prior Publication Data

US 2017/0113731 A1 Apr. 27, 2017

(30) Foreign Application Priority Data

Oct. 22, 2015 (JP) ................. 2015-208438

(51) Int. Cl.
   - B60K 13/04 (2006.01)
   - B62D 21/15 (2006.01)
   (Continued)

(52) U.S. Cl.
   CPC .............. B62D 21/157 (2013.01); B60K 1/04 (2013.01); B60K 13/04 (2013.01); B60K 15/07 (2013.01);
   (Continued)

(58) Field of Classification Search
   CPC ..................... B60K 15/03; B60K 1/04; B60K 2015/03118; B60K 2015/03315;
   (Continued)

(56) References Cited

U.S. PATENT DOCUMENTS

| 4,909,530 A | * | 3/1990 | Tsukada | B60K 13/04 |
| | | | | 180/296 |
| 5,195,607 A | * | 3/1993 | Shimada | B60K 13/04 |
| | | | | 180/296 |

(Continued)

FOREIGN PATENT DOCUMENTS

| JP | H2-59080 U | 4/1990 |
| JP | 2000-85382 A | 3/2000 |

(Continued)

OTHER PUBLICATIONS

Office Action dated Jun. 27, 2017, issued in counterpart Japanese Application No. 2015-208438, with English machine translation. (6 pages).

Primary Examiner — James A Shriver, II
Assistant Examiner — Brian L Cassidy
(74) Attorney, Agent, or Firm — Westerman, Hattori, Daniels & Adrian, LLP

(57) ABSTRACT

A vehicle structure includes a battery, a chamber that is arranged on an outer side in a vehicle width direction of the battery and provided on part of an exhaust pipe through which emission gas from a fuel cell system is emitted outside a vehicle, and a side frame that is arranged between the battery and the chamber in the vehicle width direction and extends in a fore-and-aft direction. A slider member inclined inward in the vehicle width direction toward a lower side of the vehicle is arranged between the chamber and the side frame. A lower end portion of the slider member is in a position lower than a position of a lower end portion of the battery.

11 Claims, 6 Drawing Sheets

(51) Int. Cl.
*B60K 1/04* (2006.01)
*B60K 15/07* (2006.01)
*B60K 15/03* (2006.01)
*B60K 15/063* (2006.01)

(52) U.S. Cl.
CPC ............... *B60K 2001/0438* (2013.01); *B60K 2015/03118* (2013.01); *B60K 2015/03315* (2013.01); *B60K 2015/0634* (2013.01); *B60K 2015/0638* (2013.01); *B60Y 2306/01* (2013.01)

(58) Field of Classification Search
CPC .......... B60K 2001/0438; B60K 15/073; B60Y 2306/01; B62D 21/157; B62D 25/20; B62D 25/2036
USPC .................................................. 180/309, 296
See application file for complete search history.

(56) References Cited

U.S. PATENT DOCUMENTS

| | | | | |
|---|---|---|---|---|
| 5,813,491 | A | * | 9/1998 | Sato ................... B60K 13/04 180/309 |
| 6,039,386 | A | * | 3/2000 | Hasshi ............. B62D 25/2036 296/193.07 |
| 6,173,800 | B1 | * | 1/2001 | Steenackers ........... B60K 13/04 180/296 |
| 7,383,912 | B2 | * | 6/2008 | Kondo .................. B60K 15/06 180/296 |
| 2001/0045314 | A1 | * | 11/2001 | Maki ..................... B60K 13/04 180/309 |
| 2010/0287919 | A1 | * | 11/2010 | Yamagiwa ............. B60K 13/04 60/320 |
| 2016/0339970 | A1 | * | 11/2016 | Shibutake ............ B62D 35/005 |
| 2017/0106743 | A1 | * | 4/2017 | Ajisaka .................. B60K 13/04 |
| 2017/0106744 | A1 | * | 4/2017 | Ajisaka ................ B60K 15/063 |
| 2017/0106916 | A1 | * | 4/2017 | Ajisaka ................ B62D 25/20 |

FOREIGN PATENT DOCUMENTS

| | | |
|---|---|---|
| JP | 2008-137589 A | 6/2008 |
| JP | 2008-274812 A | 11/2008 |

* cited by examiner

VEHICLE STRUCTURE

CROSS REFERENCES TO RELATED APPLICATIONS

The present application claims priority under 35 U.S.C. § 119 to Japanese Patent Application No. 2015-208438, filed Oct. 22, 2015, entitled "Vehicle Structure." The contents of this application are incorporated herein by reference in their entirety.

TECHNICAL FIELD

The present disclosure relates to a vehicle structure.

BACKGROUND

Japanese Unexamined Patent Application Publication No. 2008-274812 discloses a vehicle structure including stopper engagement parts respectively arranged under a vehicle floor and on a chamber, and when the chamber shifts toward the inner side in the vehicle width direction by a predetermined amount, the stopper engagement parts mutually engage so as to inhibit excessive shifting of the chamber.

Japanese Unexamined Patent Application Publication No. 2008-274812 is an example of related art.

In a known conventional vehicle structure, an energy storage, such as a battery or a fuel tank, is arranged centrally in the vehicle width direction and a chamber is arranged farther on the outer side in the vehicle width direction than the energy storage.

When the stopper engagement parts according to Japanese Unexamined Patent Application Publication No. 2008-274812 are applied to the vehicle structure and when, in case of a side collision, the chamber shifts toward the inner side in the vehicle width direction by a predetermined amount, the stopper engagement parts under the vehicle floor and on the chamber mutually engage to inhibit further shifting of the chamber. Until the engagement, however, the chamber is displaced toward the energy storage.

SUMMARY

In view of the above, the present disclosure provides, for example, a vehicle structure that can inhibit the interference between a chamber and an energy storage in case of a side collision.

To address the above-described issue, a vehicle structure according to one aspect of the present disclosure includes an energy storage, a chamber that is arranged farther on an outer side in a vehicle width direction than the energy storage and provided on part of an exhaust pipe through which emission gas from a system of a vehicle is emitted outside the vehicle, and a side frame that is arranged between the energy storage and the chamber in the vehicle width direction and extends in a vehicle fore-and-aft direction. A slider member inclined so as to be positioned farther on an inner side in the vehicle width direction toward a lower side is arranged between the chamber and the side frame, and a lower end portion of the slider member is in a position lower than a position of a lower end portion of the energy storage.

Accordingly, since the slider member is arranged between the chamber and the side frame, when the chamber shifts toward the inner side in the vehicle width direction in case of a side collision, the chamber comes into contact with the slider member before contacting the side frame and the battery. Since in this case, the slider member is inclined so as to be positioned farther on the inner side in the vehicle width direction toward the lower side and the lower end portion of the slider member is in a position lower than that of the lower end portion of the energy storage, the chamber is guided along the slider member and falls below the energy storage. Thus, the interference between the chamber and the energy storage can be inhibited in case of a side collision.

In addition, it is preferable for the chamber to include a coupling part coupled to a lower wall of the side frame, and an insertion portion in which a fastening member that fastens the chamber and the side frame is inserted may preferably be provided through the coupling part in a height direction. In this case, the insertion portion may be opened toward the outer side in the vehicle width direction.

Accordingly, the chamber and the side frame can be coupled together by the fastening member in normal times. In contrast, when the chamber shifts its position relative to the side frame toward the inner side in the vehicle width direction in case of a side collision, the fastening member comes off from the insertion portion through the opening provided on the outer side in the vehicle width direction such that the fastening between the chamber and the side frame is easily undone. Thus, the fall of the chamber can be suitably guided.

Further, it is preferable for the slider member to be fixed to a side wall and a lower wall of the side frame on the outer side in the vehicle width direction.

Accordingly, the strength of the slider member fixed to the side frame is enhanced such that the fall of the chamber can be suitably guided along the slider member.

Moreover, it is preferable to further include a cover member that covers the energy storage from the lower side. In this case, the cover member may be arranged in a position in which the cover member faces a lower-side portion of the slider member in the vehicle width direction.

Accordingly, when the chamber falls along the slider member, the cover member can properly support the lower-side portion of the slider member from the inner side in the vehicle width direction. Thus, the fall of the chamber can be suitably guided.

BRIEF DESCRIPTION OF THE DRAWINGS

The advantages of the disclosure will become apparent in the following description taken in conjunction with the following drawings.

FIG. 6A illustrates a state before a collision, FIG. 6B illustrates a state in which the chamber and the slider member are in contact with each other after the collision, and FIG. 6C illustrates a state in which the chamber is in a fall after the collision.

DETAILED DESCRIPTION

Figure 1:
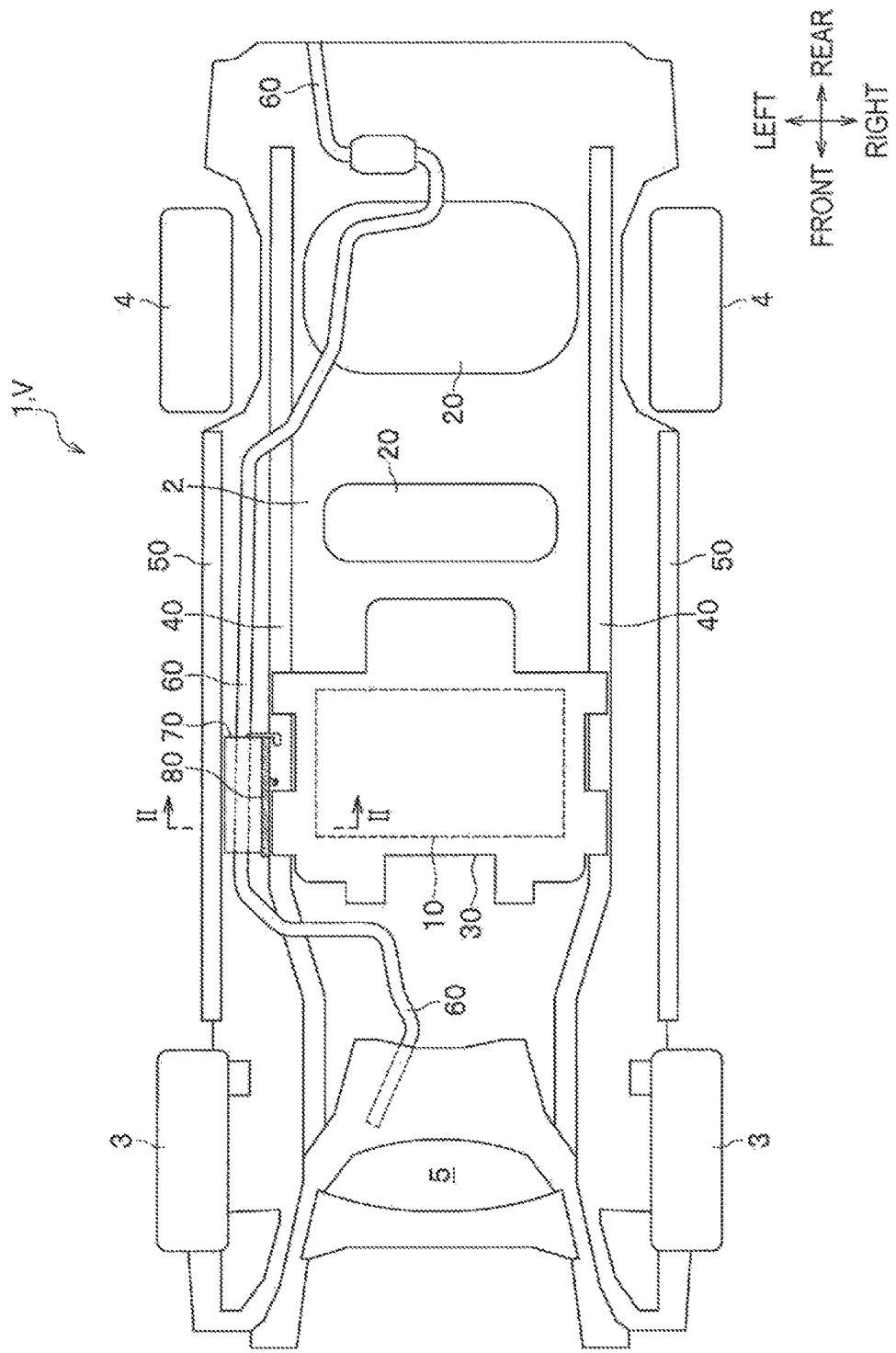
FIG. 1 is a bottom view of an automobile with a vehicle structure according to an embodiment.

An embodiment of the present disclosure is described in detail by referring to the drawings when necessary. The same references are given to the same constituents and overlapping descriptions are omitted.

Although the present embodiment is described while taking a case in which a vehicle structure according to the present disclosure is applied to a fuel cell automobile as an example, the example is not intended to limit the uses of the vehicle structure according to the present disclosure. In describing directions, the descriptions are based on the front, rear, left, right, upper, and lower sides viewed from a driver. The "vehicle width direction" is synonymous with the "left-right direction."

As illustrated in FIG. 1, under a floor panel 2, an automobile V with a vehicle structure 1 according to an embodiment includes a battery 10, two fore-and-aft hydrogen tanks 20 (front tank and rear tank), a cover member 30, a left-right pair of side frames 40, a left-right pair of side sills 50, an exhaust pipe 60, a chamber 70, and a slider member 80. In FIG. 1, the slider member 80 is marked with dots.

The battery 10 and the hydrogen tanks 20 are both arranged centrally in the vehicle width direction and are provided in this named order from the vehicle front side. The battery 10 and the hydrogen tank 20 closer to the front of the vehicle are positioned between front tires 3 and rear tires 4. The hydrogen tank 20 on the vehicle rear side is provided in a position that corresponds to the positions of the rear tires 4 in the vehicle width direction.

The battery 10 supplies power to a drive motor, which is mounted in a power source compartment 5 provided in a front portion of the automobile V and is not illustrated. The battery 10 corresponds to an "energy storage" according to an aspect of the embodiment.

The hydrogen tanks 20 are each a hollow container, which stores hydrogen gas (fuel gas). The hydrogen tanks 20 are placed in a state where each of the length directions thereof is oriented in the vehicle width direction.

Figure 2:
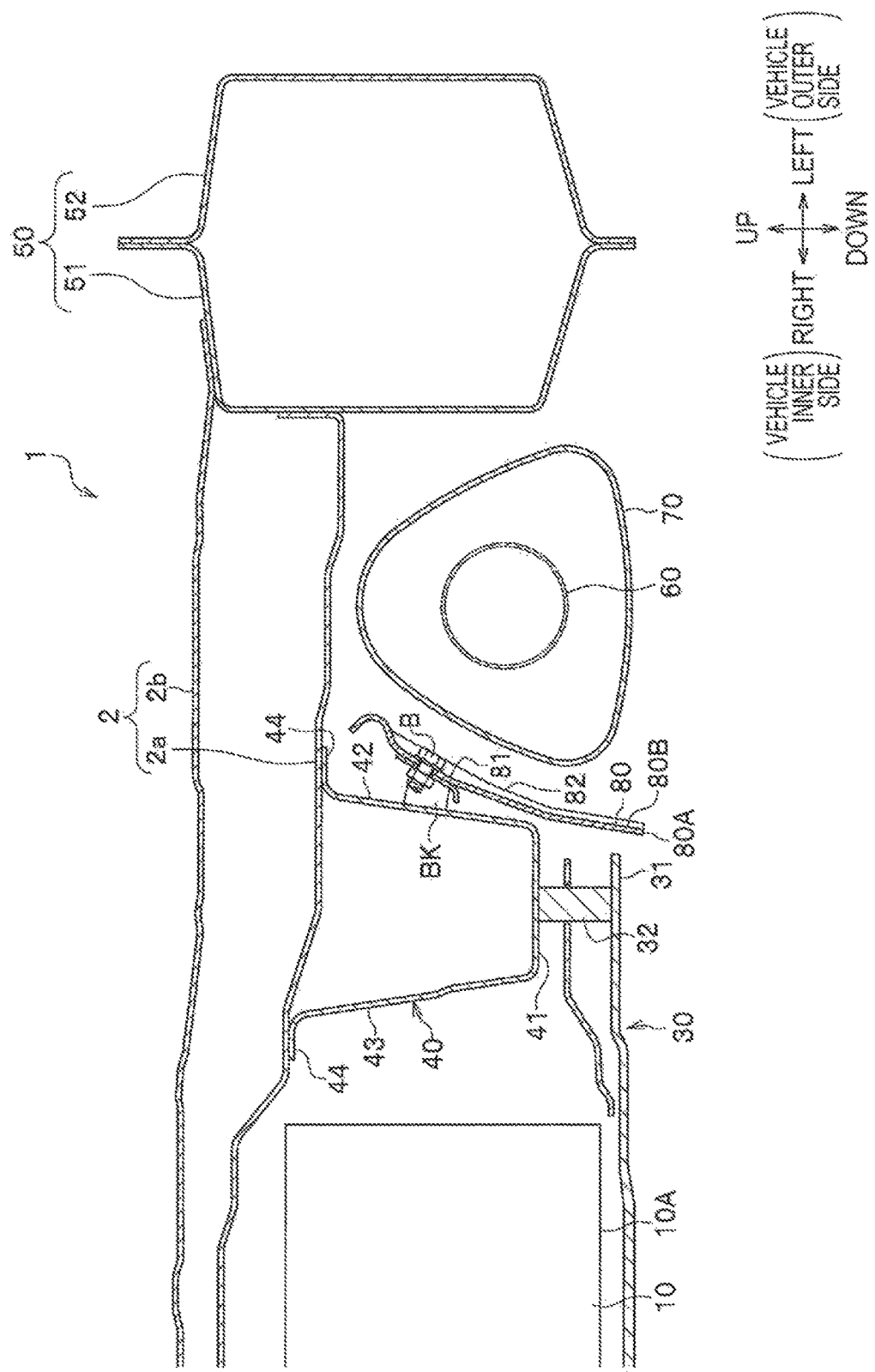
FIG. 2 is a cross-sectional view based on TI-TI in FIG. 1.

As illustrated in FIG. 2, the cover member 30 is a member made of metal, which covers the battery 10 from the lower side. The cover member 30 is formed by combining a plurality of metal plates that are each formed by getting folded into a predetermined shape. The cover member 30 extends in the fore-and-aft direction and the vehicle width direction. An end portion 31 of the cover member 30 on the outer side in the vehicle width direction extends farther outward in the vehicle width direction than the battery 10 and reaches an area under the side frame 40. The end portion 31 of the cover member 30 on the outer side in the vehicle width direction is fixed to a lower wall 41 of the side frame 40 through a fixing member 32 that extends in the height direction. The end portion 31 of the cover member 30 on the outer side in the vehicle width direction is provided in a position in which the end portion 31 faces a lower-side portion 80B of the slider member 80 in the vehicle width direction. The lower-side portion 80B constitutes a region in a predetermined range of the slider member 80, which includes a lower end portion 80A. The end portion 31 of the cover member 30 on the outer side in the vehicle width direction is desired to be provided farther on the lower side than a lower end portion 10A of the battery 10 and be in a position higher than that of the lower end portion 80A of the slider member 80 or in a position the same in height as that of the lower end portion 80A.

The side frame 40 is a member made of metal, which extends in the fore-and-aft direction. The side frame 40 is arranged farther on the outer side in the vehicle width direction than the battery 10. The side frame 40 is formed into a groove shape (a hat shape), which is opened toward the upper side and projects toward the lower side in a vertical cross-sectional view. The side frame 40 includes the lower wall 41, which extends in the vehicle width direction and the fore-and-aft direction, a left-side wall 42 and a right-side wall 43, which extend upward and outward from a left end portion and a right end portion of the lower wall 41, respectively, and flanges 44, which extend outward and approximately horizontally from respective upper end portions of the left-side wall 42 and the right-side wall 43. The flanges 44 are fixed to a lower face of the floor panel 2 by welding.

The floor panel 2 is installed between left and right side sills 50. The floor panel 2 illustrated in FIG. 2 is constituted of a lower floor panel 2a and an upper floor panel 2b, which is arranged over and away from the lower floor panel 2a.

The side sill 50 is a member made of metal, which extends in the fore-and-aft direction. The side sill 50 is arranged farther on the outer side in the vehicle width direction than the side frame 40. The side sill 50 has a hollow shape, which is a shape like an approximately rectangular prism in the embodiment. The side sill 50 is constituted of a side sill inner panel 51 on the vehicle inner side and a side sill outer panel 52 on the vehicle outer side. The side sill inner panel 51 is formed into a groove shape (a hat shape), which is opened toward the vehicle outer side and projects toward the vehicle inner side in a vertical cross-sectional view. The side sill outer panel 52 is formed into a groove shape (a hat shape), which is opened toward the vehicle inner side and projects toward the vehicle outer side in a vertical cross-sectional view.

The exhaust pipe 60 is a member made of metal, through which off-gas (anode off-gas and cathode off-gas) emitted from a fuel cell system, which is not illustrated, is emitted outside the vehicle. The fuel cell system corresponds to a "system of a vehicle" according to an aspect of the embodiment. The exhaust pipe 60 is constituted of a cylindrical pipe member. The exhaust pipe 60 illustrated in FIG. 1 extends in the fore-and-aft direction and extends from the inside of the power source compartment 5 to the rear end of the automobile V. Part of the exhaust pipe 60, which is from a front end portion to a middle portion, runs in front of the battery 10 and passes on the left side of the battery 10 to extend to the vehicle rear side. On the left side of the battery 10, the exhaust pipe 60 is arranged between the side frame 40 and the side sill 50. The exhaust pipe 60 may be arranged on the right side of the battery 10. In this case, the chamber 70 and the slider member 80 are also arranged on the right side of the battery 10.

On part of the exhaust pipe 60 in the fore-and-aft direction, the chamber 70 is provided so as to surround the perimeter of the exhaust pipe 60. The chamber 70 has a function of reducing exhaust sound. As illustrated in FIG. 2, the chamber 70 is arranged farther on the outer side in the vehicle width direction than the battery 10 and the side frame 40. The chamber 70 is arranged farther on the inner side in the vehicle width direction than the side sill 50. That is, the chamber 70 is arranged between the side frame 40 and the side sill 50. The chamber 70 illustrated in FIG. 2 has a triangular outer shape in a vertical cross-sectional view, which is rounded in its corner portions.

Figure 3:
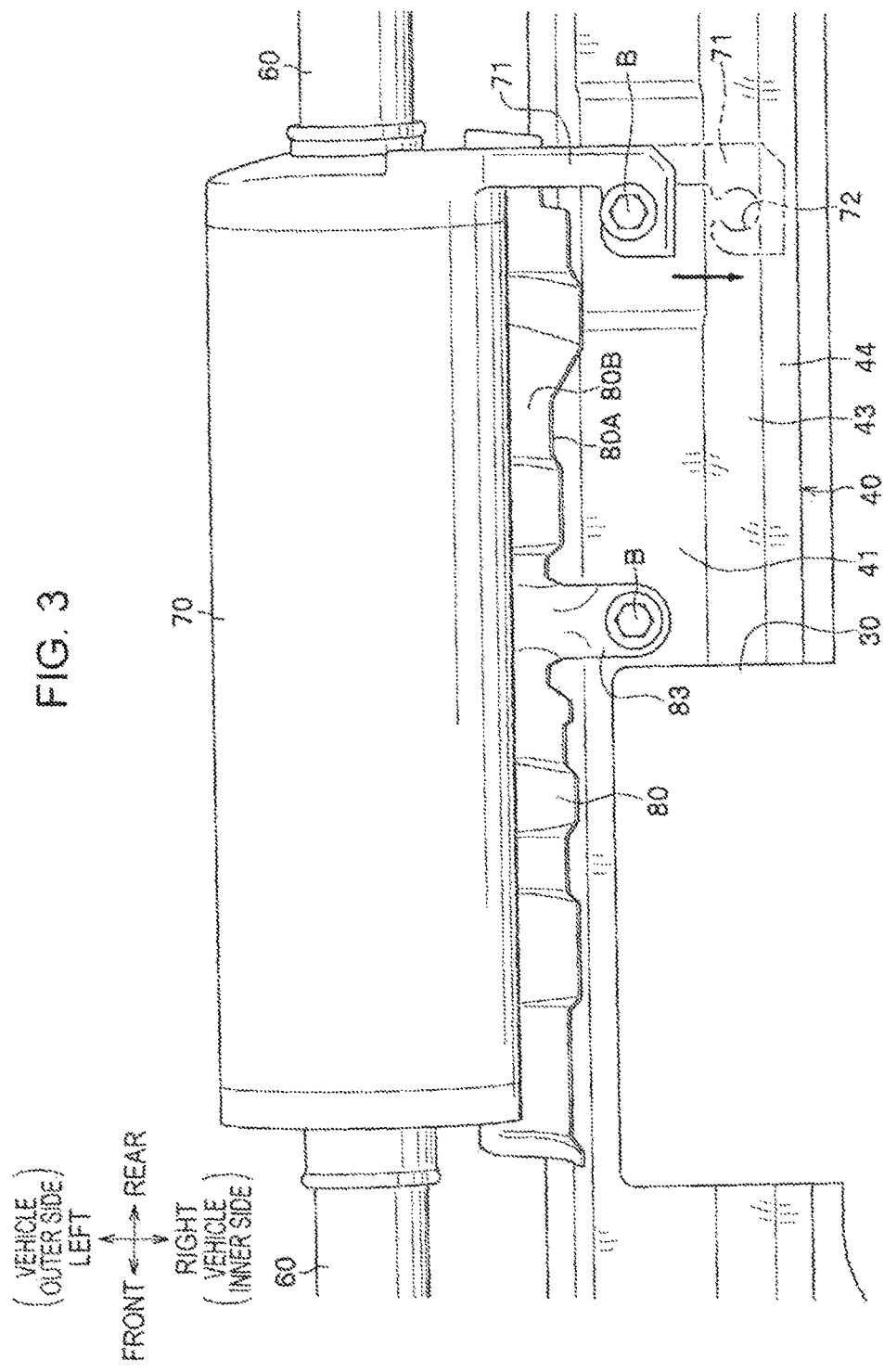
FIG. 3 is a bottom view illustrating the chamber in FIG. 1 and the periphery thereof through enlargement.

As illustrated in FIG. 3, the chamber 70 includes a coupling part 71 so as to be coupled to the side frame 40. The coupling part 71 projects from a rear end portion of the chamber 70 toward the vehicle inner side and then projects toward the vehicle front side. That is, the coupling part 71 is constituted of a projecting piece, which is shaped like the capital letter L in a bottom view. The coupling part 71 passes under the lower end portion 80A of the slider member 80 and reaches the lower wall 41 of the side frame 40. The coupling part 71 is in contact with the lower wall 41 of the side frame 40 from the lower side and fixed with a bolt B. The coupling part 71 is arranged away from an attachment portion 83 of the slider member 80 and farther on the vehicle rear side than the attachment portion 83.

The coupling part 71 includes an insertion portion 72 in which the bolt B is inserted. The insertion portion 72 is a through hole, which is opened toward both the upper and lower sides and toward the outer side in the vehicle width direction. In other words, the insertion portion 72 is formed by opening the through hole, which is shaped like a circle in a bottom view, on the outer side in the vehicle width direction. Accordingly, when the chamber 70 shifts its position relative to the side frame 40 toward the inner side in the vehicle width direction in case of a side collision, the coupling part 71 also undergoes relative shifting toward the inner side in the vehicle width direction (see the chain double-dashed lines in FIG. 3). As a result, the bolt B comes off from the insertion portion 72 through the opening provided on the outer side in the vehicle width direction such that the fastening of the chamber 70 and the side frame 40 is undone.

As illustrated in FIG. 2, the slider member 80 is a member made of metal, which extends in the fore-and-aft direction and the height direction. The slider member 80 is formed by folding a single plate of metal into a predetermined shape. The slider member 80 is arranged among the chamber 70, the side frame 40, and the cover member 30. The slider member 80 is inclined so as to be positioned farther on the inner side in the vehicle width direction toward the lower side. The lower end portion 80A of the slider member 80 is in a position lower than that of the lower end portion 10A of the battery 10.

Figure 4:
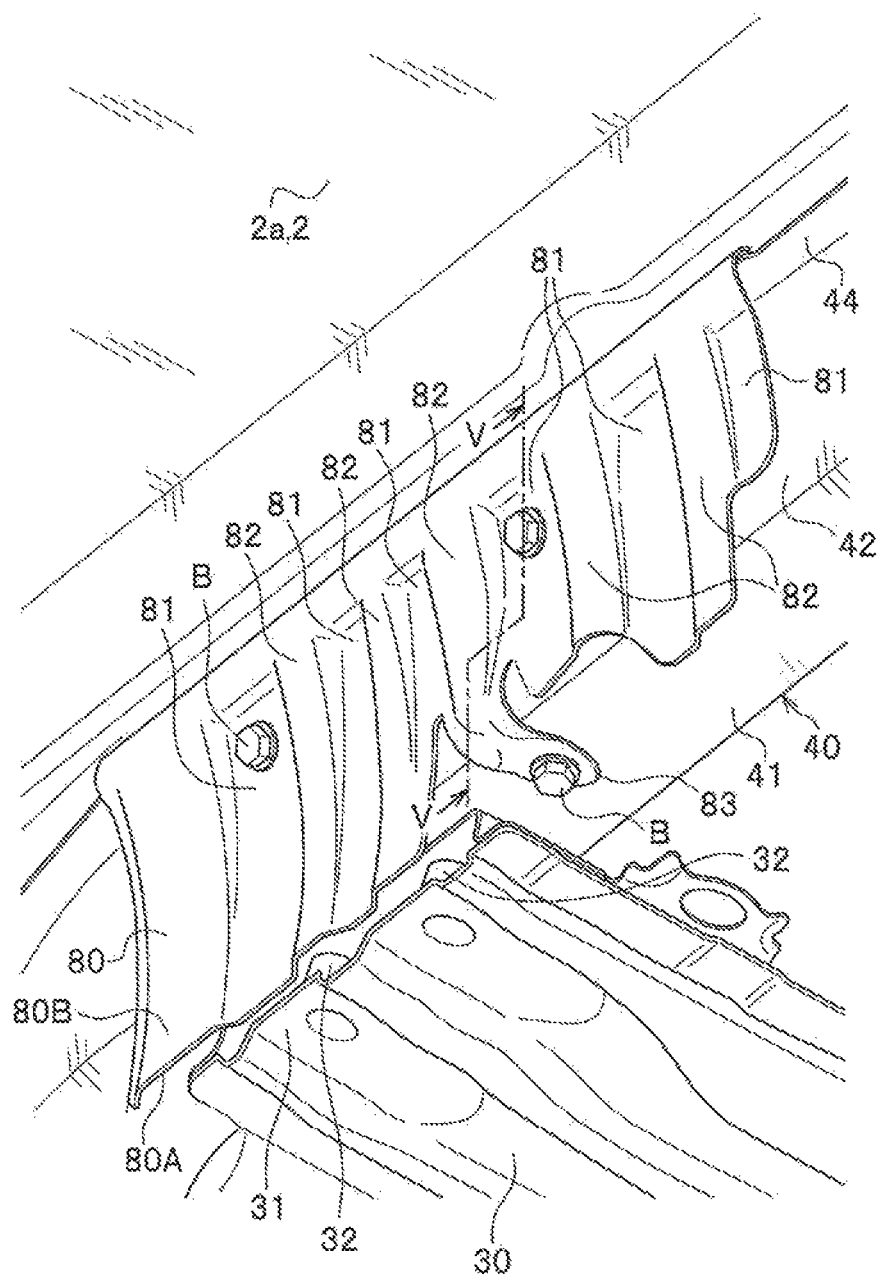
FIG. 4 is a perspective view of the slider member in FIG. 1 and the periphery thereof, which are viewed upward from the diagonally left rear side.
Figure 5:
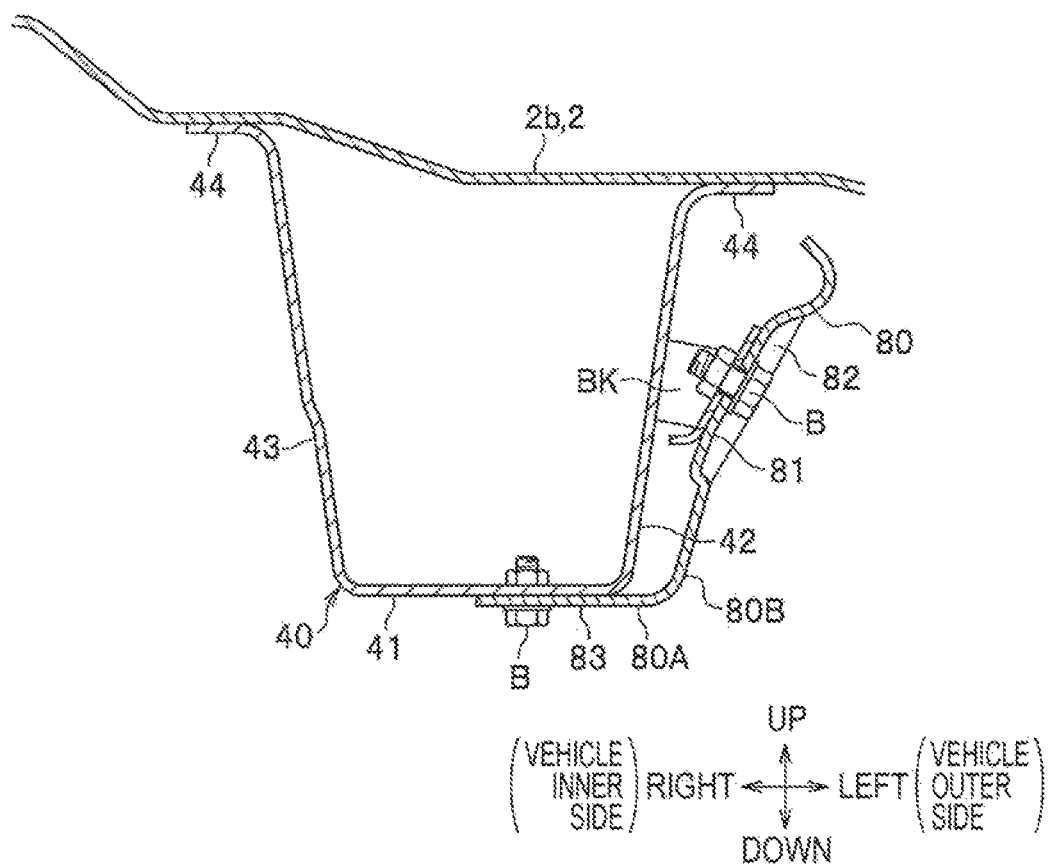
FIG. 5 is a cross-sectional view based on V-V in FIG. 4.

Referring now to FIGS. 4 and 5, a fixing structure of the slider member 80 and the side frame 40 is described. In FIG. 4, for convenience in description, the illustrations of the exhaust pipe 60 and the chamber 70 are omitted. As illustrated in FIG. 4, the slider member 80 includes a plurality of projecting portions 81 and a plurality of depressed portions 82, which are formed alternately in the fore-and-aft direction. The projecting portion 81 and the depressed portion 82 extend in the height direction and the fore-and-aft direction. Two of the projecting portions 81, which are positioned near a front end portion and a middle portion of the slider member 80, are fixed to the left-side wall 42 of the side frame 40 via brackets BK (see FIG. 5) using the bolts B, respectively. The fastening positions of the bolts B on the slider member 80 may be changed as needed and the slider member 80 may be directly fastened to the side frame 40 using the bolts B.

As illustrated in FIG. 5, a face of the projecting portion 81 on the vehicle inner side has a projecting shape and a face of the projecting portion 81 on the vehicle outer side has a depressed shape. A face of the depressed portion 82 on the vehicle inner side has a depressed shape and a face of the depressed portion 82 on the vehicle outer side has a projecting shape. The projecting portion 81 is in contact with the left-side wall 42 of the side frame 40 from the vehicle outer side. The depressed portion 82 is arranged away from the left-side wall 42 of the side frame 40 toward the vehicle outer side. The projecting portion 81 may be close to the left-side wall 42 of the side frame 40, that is may be arranged slightly away toward the vehicle outer side.

As illustrated in FIGS. 4 and 5, near a middle portion of the lower end portion 80A of the slider member 80, the attachment portion 83 extends toward the side frame 40 and toward the inner side in the vehicle width direction. The attachment portion 83 is constituted of a tongue-like projecting piece with an outer shape that is shaped like the capital letter U. The attachment portion 83 is in contact with the lower wall 41 of the side frame 40 from the lower side and fixed with the bolt B.

Figure 6A:
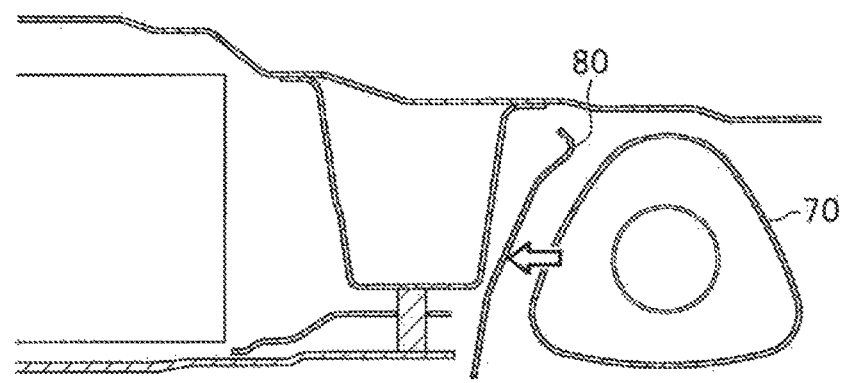
FIGS. 6A to 6C are cross-sectional views each illustrating a state of the vehicle structure, which is caused in case of a side collision, and specifically.
Figure 6B:
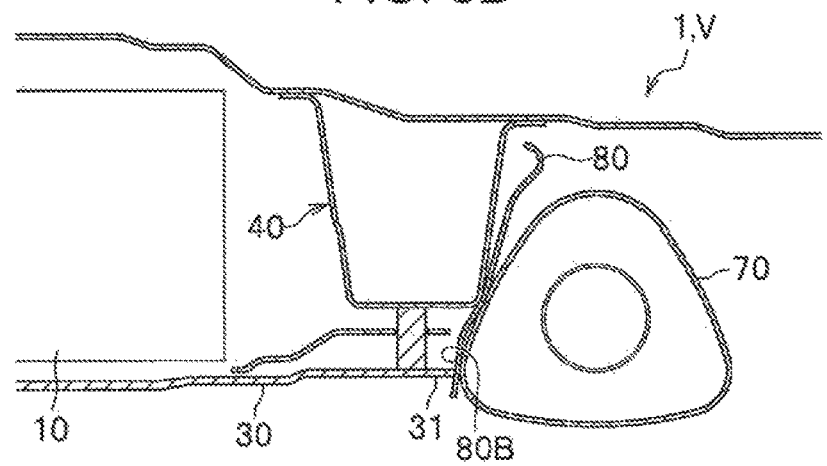
Figure 6C:
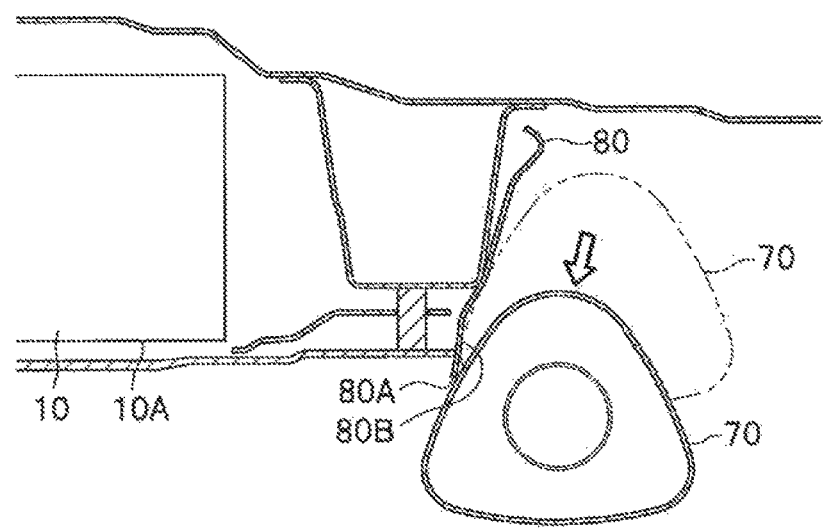

Referring now to FIGS. 6A to 6C, operations performed in case of a side collision of the vehicle structure 1 according to the present embodiment are described. In FIGS. 6A to 6C, for convenience in description, the illustrations of the brackets BK and the bolts B are omitted.

As illustrated in FIG. 6A, in a state before the side collision, the chamber 70 is arranged away from the slider member 80 toward the outer side in the vehicle width direction.

As illustrated in FIG. 6B, when the automobile V undergoes the side collision, the chamber 70 shifts toward the inner side in the vehicle width direction as the side sill 50 is deformed. At the time, because of the slider member 80 arranged between the chamber 70 and the side frame 40, the chamber 70 comes into contact with the slider member 80 before contacting the side frame 40 and the battery 10.

When collision load acts on the slider member 80 as the chamber 70 shifts, the slider member 80 is deformed and the lower-side portion 80B comes into contact with the end portion 31 of the cover member 30, which is positioned on the outer side in the vehicle width direction.

Since as illustrated in FIG. 6C, the slider member 80 is inclined so as to be positioned farther on the inner side in the vehicle width direction toward the lower side, the chamber 70 is diagonally guided downward along the slider member 80.

Since the lower end portion 80A of the slider member 80 is in a position lower than that of the lower end portion 10A of the battery 10, the chamber 70 falls below the battery 10 in the end.

Advantages of the vehicle structure 1 according to the present embodiment are described below.

In the vehicle structure 1 according to the present embodiment, the chamber 70 is guided along the slider member 80 to fall below the battery 10 and thus, the interference between the chamber 70 and the battery 10 can be inhibited in case of a side collision.

In addition, according to the present embodiment, the chamber 70 and the side frame 40 can be coupled together by the bolts B in normal times.

In contrast, when the chamber 70 shifts its position relative to the side frame 40 toward the inner side in the vehicle width direction in case of a side collision, since the insertion portion 72 of the chamber 70 is opened toward the outer side in the vehicle width direction, the bolt B comes off from the insertion portion 72 through the opening provided on the outer side in the vehicle width direction such that the fastening between the chamber 70 and the side frame 40 is easily undone. Thus, the fall of the chamber 70 can be suitably guided.

Further, according to the present embodiment, since the slider member 80 is fixed to the left-side wall 42 and the lower wall 41 of the side frame 40, the strength of the slider member 80 fixed to the side frame 40 can be enhanced. Thus, the fall of the chamber 70 along the slider member 80 can be suitably guided.

Moreover, according to the present embodiment, the cover member 30 is arranged in a position in which the cover member 30 faces the lower-side portion 80B of the slider member 80 in the vehicle width direction and as a result, when the chamber 70 falls along the slider member 80, the cover member 30 can properly support the lower-side portion 80B of the slider member 80 from the inner side in the vehicle width direction. Thus, the fall of the chamber 70 can be suitably guided.

Although the vehicle structure 1 according to the present embodiment is described in detail above with reference to the drawings, the present disclosure is not limited thereto and the present disclosure can be changed as needed within the scope not deviating from the gist of the present disclosure.

Although in the present embodiment, the application to a fuel cell automobile is taken as an example, the present disclosure is also applicable to a gasoline engine car and the like for other examples. In the application to a gasoline engine car, an internal combustion engine corresponds to the "system of the vehicle" according to an aspect of the embodiment and the exhaust gas from the internal combustion engine is emitted outside the vehicle through the exhaust pipe 60. In this case, a fuel tank corresponds to the "energy storage" according to an aspect of the embodiment and the slider member 80 is arranged between the chamber 70 and the fuel tank. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle structure comprising:
an energy storage;
a chamber that is disposed on an outer side in a vehicle width direction of the energy storage and provided to an exhaust pipe through which emission gas from a system of a vehicle is emitted toward an outside of the vehicle;
a side frame that is disposed between the energy storage and the chamber in the vehicle width direction and extends in a vehicle fore-and-aft direction; and
a slider member disposed between the chamber and the side frame in the vehicle width direction, wherein the slider member is inclined inward in the vehicle width direction toward a lower side of the vehicle, and a lower end portion of the slider member is located at a position lower than a lower end portion of the energy storage,
wherein the chamber includes a coupling part coupled to a lower wall of the side frame,
the coupling part includes an insertion portion penetrating through the coupling part in a height direction, wherein a fastening member that fastens the chamber and the side frame is inserted in the insertion portion, and
the insertion portion is opened toward the outer side in the vehicle width direction.

2. The vehicle structure according to claim 1, wherein the slider member is fastened to a lower wall of the side frame and an outer side wall of the side frame in the vehicle width direction.

3. The vehicle structure according to claim 1, further comprising
a cover member that covers a lower side of the energy storage, the cover member being disposed at a position opposite to a lower portion of the slider member in the vehicle width direction.

4. The vehicle structure according to claim 1, wherein the slider member has a plate shape extending from an upper part to the lower end portion thereof.

5. The vehicle structure according to claim 1, wherein the coupling part includes a base member extending inward in the vehicle width direction from a body of the chamber and a bent part bent in the vehicle fore-and-aft direction from an end of the base member, the bent part includes the insertion portion.

6. The vehicle structure according to claim 3, wherein the cover member extends outwardly in the vehicle width direction and has an outer tip end located opposite to the lower portion of the slider member in the vehicle width direction.

7. The vehicle structure according to claim 1, wherein the chamber includes an inner side surface facing the slider member, the inner side surface extending substantially parallel to the inclined surface of the slider member.

8. The vehicle structure according to claim 1, wherein the energy storage is a tank member.

9. The vehicle structure according to claim 1, wherein the slider member is fastened to an outer side wall of the side frame in the vehicle width direction and a lower wall of the side frame, and
a fastening point between the slider member and the lower wall of the side frame is spaced away from a coupling point between the coupling part and the lower wall of the side frame in the vehicle fore-and-aft direction.

10. A vehicle structure comprising:
an energy storage;
a chamber that is disposed on an outer side in a vehicle width direction of the energy storage and provided to an exhaust pipe through which emission gas from a system of a vehicle is emitted toward an outside of the vehicle;
a side frame that is disposed between the energy storage and the chamber in the vehicle width direction and extends in a vehicle fore-and-aft direction;
a slider member disposed between the chamber and the side frame in the vehicle width direction, wherein the slider member is inclined inward in the vehicle width direction toward a lower side of the vehicle, and a lower end portion of the slider member is located at a position lower than a lower end portion of the energy storage; and
a cover member disposed below a bottom wall of the energy storage and covering a lower surface of the energy storage, the cover member extending outwardly in the vehicle width direction and having an outer tip end located opposite to a lower portion of the slider member in the vehicle width direction.

11. The vehicle structure according to claim 10, wherein the cover member includes an end portion in the vehicle width direction fixed to a bottom wall of the side frame via a fixing member.

* * * * *